United States Patent
Graber et al.

(10) Patent No.: US 7,687,791 B2
(45) Date of Patent: Mar. 30, 2010

(54) ETHERNET DATA SIGNAL TRANSMISSION APPARATUS

(75) Inventors: Steffan Graber, Mannheim (DE); Renato Kitchener, West Sussex (GB)

(73) Assignee: Pepperl & Fuchs (DE) (DE)

(*) Notice: Subject to any disclaimer, the term of this patent is extended or adjusted under 35 U.S.C. 154(b) by 0 days.

(21) Appl. No.: 12/227,113

(22) PCT Filed: Apr. 30, 2007

(86) PCT No.: PCT/GB2007/001575

§ 371 (c)(1),
(2), (4) Date: Nov. 5, 2008

(87) PCT Pub. No.: WO2007/129031

PCT Pub. Date: Nov. 15, 2007

(65) Prior Publication Data

US 2009/0092398 A1    Apr. 9, 2009

(30) Foreign Application Priority Data

| May 5, 2006 | (GB) | ................................. 0608816.5 |
| May 8, 2006 | (GB) | ................................. 0608914.8 |
| May 11, 2006 | (GB) | ................................. 0609303.3 |

(51) Int. Cl.
    *G02B 27/00* (2006.01)

(52) U.S. Cl. .................. 250/551; 361/56; 398/163; 398/164

(58) Field of Classification Search ................. 250/551; 398/163, 164; 361/56
See application file for complete search history.

(56) References Cited

U.S. PATENT DOCUMENTS

| 5,519,527 A | 5/1996 | Panton |
| 5,877,882 A * | 3/1999 | Green et al. ................. 398/164 |
| 6,476,520 B1 | 11/2002 | Bohm et al. |

FOREIGN PATENT DOCUMENTS

| WO | WO-97/41516 A1 | 11/1997 |
| WO | WO-01/65731 A | 9/2001 |
| WO | WO-01/76107 A1 | 10/2001 |

* cited by examiner

*Primary Examiner*—Seung C Sohn
(74) *Attorney, Agent, or Firm*—Lerner, David, Littenberg, Krimholz & Mentlik, LLP

(57) ABSTRACT

Data signal isolation apparatus comprising a first media converter adapted to convert outgoing electrical data signals into outgoing optical data signals, an optical data signal transmission means adapted to transmit said outgoing optical data signals, a second media converter adapted to convert said outgoing optical data signals back into outgoing electrical data signals, and an intrinsically safe power supply, in which the optical data signal transmission means comprises an electrical isolation gap, and in which the second media converter is powered by the intrinsically safe power supply.

14 Claims, 2 Drawing Sheets

ETHERNET DATA SIGNAL TRANSMISSION APPARATUS

BACKGROUND OF THE INVENTION

This invention relates to data signal isolation apparatus, for use particularly, but not exclusively, to electrically isolate Ethernet signals for use in an associated intrinsically safe part of a circuit to which the apparatus is applied.

Known Ethernet transceivers comprise non-intrinsically safe galvanic isolators or transformers, so when Ethernet is used in intrinsically safe environments, it is usually made safe by the use of classic Zener barriers, with the shunt connection taken to a safety Earth.

FIG. 1 shows just such an arrangement, in which a non intrinsically safe Ethernet connection 12, is isolated by a non-intrinsically safe transformer 7, and is rendered intrinsically safe by being power restricted by a classic shunt barrier comprising fuse protection 4, voltage clamping 3, and current limiting resistors 5. As such, an output connection 6 is intrinsically safe, and any over-voltage is shunted to a safety ground or a safety earth E.

However, whilst this arrangement is satisfactory for low speed data transmission, high speed performance is affected by the parasitic influence of the protection components, for example capacitance and resistance or impedance of the Zener diodes.

Furthermore, the known isolating transformer 7 does not meet the segregation requirements of the EN50020 standard, because of insufficient space for "gapping" within the former. As such, it cannot be used for intrinsically safe isolation, so an additional segregation component, which does meet the required standard, has to be added. However, this leads to an increase in the stray inductance, further decreasing signal fidelity.

SUMMARY OF THE INVENTION

The present invention is intended to overcome some of the above problems, and in particular to remove the parasitic influences on the signal lines from voltage clamping, and to provide intrinsic safety without the need for a safety earth.

Therefore, according to the present invention data signal isolation apparatus comprises a first media converter adapted to convert outgoing electrical data signals into outgoing optical data signals, an optical data signal transmission means adapted to transmit said outgoing optical data signals, a second media converter adapted to convert said outgoing optical data signals back into outgoing electrical data signals, and an intrinsically safe power supply, in which the optical data signal transmission means comprises an electrical isolation gap, and in which the second media converter is powered by the intrinsically safe power supply.

Thus, electrical data signals are isolated, and therefore rendered intrinsically safe, separately from any power supply. As such, the data signals are not effected by any of the above described parasitic influences. The power required to drive the second media converter, and therefore transmit the data signals into an associated intrinsically safe part of a circuit of which the apparatus of the invention forms a part in use, is provided by the intrinsically safe power supply, but this power does not influence the data signals in any way.

An optical data signal transmission means with an electrical isolation gap is a very effective isolation device, because it will not, under any normal or fault conditions, add voltage to the associated intrinsically safe part of the circuit.

The intrinsically safe power supply can be isolated in any of the known ways, but preferably it can be provided with galvanic isolation means. In addition, the intrinsically safe power supply can comprise voltage limiting means, which can be any known voltage clamping arrangement, for example protected Zener diodes or any other similar electronic voltage limiting arrangement.

It will be appreciated that the apparatus of the invention is only practical if it can send and receive data signals. Therefore, in a preferred construction the second media converter can be adapted to convert incoming electrical data signals into incoming optical data signals; the optical data signal transmission means can be adapted to transmit said incoming optical data signals; and the first media converter can be adapted to convert said incoming optical data signals back into incoming electrical data signals. The incoming optical data signals will be subject to the electrical isolation gap, so they too will be isolated from the non intrinsically safe part of the circuit.

In a preferred construction the optical data signal transmission means can comprise an optical isolation circuit comprising a pair of mutually opposed optical transceivers, each comprising an optical transmitter means and an optical detector means, which are aligned with the optical detector means and the optical transmitter means respectively of the other.

In order to provide the electrical isolation gap, the optical transceivers can be spaced apart by a segregation distance of at least 1 mm, which can be provided along an optical cable or in air.

Preferably the apparatus can further comprise data output and data input lines attached to the second media converter, and these lines can be provided with current limiting means. As such, electrical data signals transmitted into the associated intrinsically safe part of the circuit will be current limited as well as voltage limited and isolated.

The current limiting means can comprise one or more current limiting resistors, and the data output and data input lines can be further provided with one or more fuses to protect the resistors. The fuses can also be utilised for their current limiting resistance, which would allow the resistance provided by the current limiting resistors to be lower.

Alternatively, the intrinsically safe power supply can comprise current limiting means. However, this is only suitable where the intrinsically safe side of the optical isolation circuit and the second media converter will not, under any normal or fault condition, add any voltage or current to the associated intrinsically safe part of the circuit. The current limiting means can be one or more current limiting resistors, and the intrinsically safe power supply can further comprise one or more fuses.

In one version of the invention a galvanic isolating transformer can be provided downstream of the second media converter, for balancing reasons. The galvanic isolating transformer can not be capable of storing sufficient energy to cause an incendive arc in the associated intrinsically safe part of the circuit.

The invention can be used to isolate any known type of electrical signals, but in a preferred embodiment the apparatus can be adapted to isolate electrical Ethernet data signals.

Ethernet cables typically comprise eight cores, with four allocated for data transmission. As such, the data input and output lines referred to above can each comprise a pair of positive and negative cables, and the current limiting resistors can be disposed symmetrically about the four lines.

In order to be of use in the hazardous area, the isolated Ethernet data signals need to be received by an associated Ethernet device. Therefore, an electronic Ethernet device can be provided downstream of the second media converter. This device can be disposed anywhere in the associated intrinsically safe part of the circuit.

BRIEF DESCRIPTION OF THE DRAWINGS

The invention can be performed in various ways, but one embodiment will now be described by way of example, and with reference to the accompanying drawings, in which.

DETAILED DESCRIPTION

Figure 1:
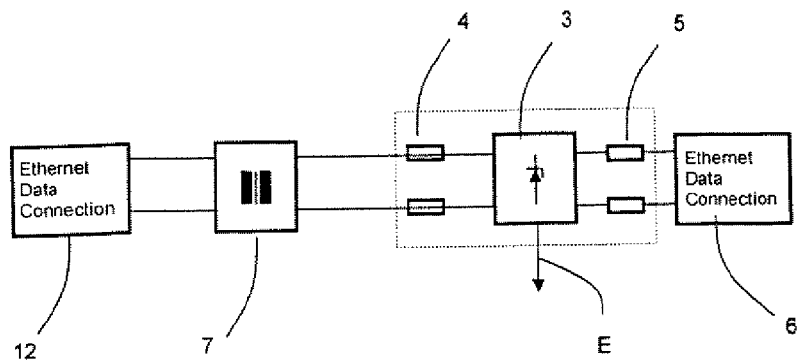
FIG. 1 is a diagrammatic view of a prior art intrinsically safe Ethernet system.
Figure 2:
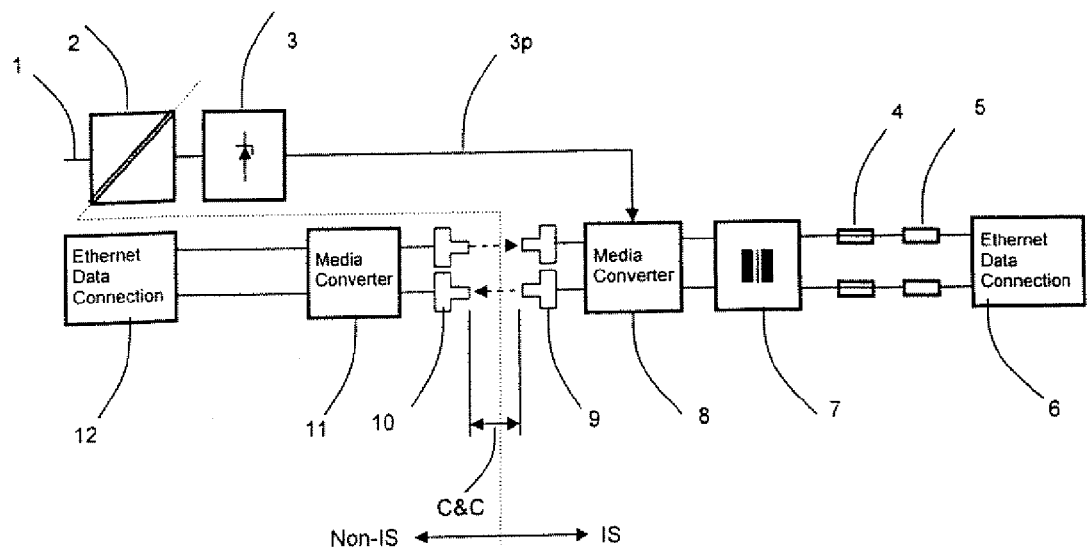
FIG. 2 is a diagrammatic view of data signal isolation apparatus according to the present invention.

As shown in FIG. 2 data signal isolation apparatus comprises a first media converter 11 adapted to convert outgoing electrical data signals into outgoing optical data signals, an optical data signal transmission means, in the form of optical transceivers 10 and 9, which is adapted to transmit said outgoing optical data signals, a second media converter 8 adapted to convert said outgoing optical data signals back into outgoing electrical data signals, and an intrinsically safe power supply 3p. As described further below, the optical data signal transmission means (10, 9) comprises an electrical isolation gap C&C, and the second media converter 8 is powered by the intrinsically safe power supply 3p.

FIG. 2 shows the apparatus of the invention in an in use configuration. A non intrinsically safe Ethernet data connection 12, comprising the four data cores of an non-intrinsically safe Ethernet cable (not shown), is applied to the first media converter 11. This connection 12 could be from a lap-top computer, which could comprise the known non intrinsically safe transformers and/or other electronic components. Power from the associated power lines of the Ethernet cable powers the first media converter 11. (As an alternative, power from the non intrinsically safe side of the power supply 2 can power the first media converter 11). An intrinsically safe Ethernet data connection 6 comprising four data cores for use in an intrinsically safe Ethernet cable, is provided downstream of the second media converter 8. The connection 6 is connected up to an associated intrinsically safe part of the circuit (not shown) of which the apparatus forms a part. These four data cores are combined with four power cores provided with power from a different power source, to form a full Ethernet connection (not shown).

The media converters 11 and 8 are known devices which convert electrical data signals to optical signals and visa versa. The optical transceivers 10 and 9 both comprise an optical transmitter and an optical detector, which may be integrated into one housing. The optical transceivers 10 and 9 are mutually opposed, so the transmitter and detector of one is aligned with the detector and transmitter respectively of the other.

The optical transceivers 10 and 9 are spaced apart by a segregation distance C&C. This distance meets the requirements of the relevant intrinsically safe standards. The segregation distance C&C can simply be a space, or it can be along an optical cable. Whichever is provided, the segregation distance is at least 1 mm.

The intrinsically safe power supply 3p is powered by a power source 1, which is made safe by galvanic isolation 2. Such an arrangement is sufficient because the intrinsically safe power supply 3p is only being used as such, and there is no requirement to carry any data signals. The galvanic isolation 2 has sufficient galvanic segregation to satisfy the relevant intrinsically safe standards.

As the intrinsically safe power supply 3p comprises no data signal, it is an ideal point to apply voltage clamping 3, which meets the relevant intrinsically safe standards. The voltage clamping 3 defines the voltage parameter Uo without influencing the data signals, provided the media converter 8 does not add to the voltage parameter Uo.

Therefore, both the power source 1 and the Ethernet input 12 are provided with intrinsically safe isolation, and the source voltage is limited to Uo. The current could be limited on the intrinsically safe power supply 3p, but under certain conditions a higher current could be output by the media converter 8, so in the embodiment shown the current is limited to Io downstream of the media converter 8.

In order to achieve this, current limiting resistors 5 are placed in the data output and data input lines downstream of the second media converter 8. (only two resistors 5 are shown in FIG. 2, but in practice such resistors can be placed symmetrically about the four positive and negative Ethernet data cores, for balance reasons.) In addition, fuses 4 are also placed in the data output and data input lines to protect the resistors 5. The fuses 4 can also be used for additional current limiting resistance.

In theory the resistors 5 could be a parasitic influence on the performance of the apparatus, however in the embodiment shown, the supply voltage Uo is only seven volts, so the limiting resistors 5 do not have to exceed six ohms. Such an arrangement is sufficient for connection to an Ethernet cable of up to one hundred metres in length, provided the cable inductance over resistance ratio is adequately low, which it would be to meet the relevant intrinsically safe standards.

The termination values of the apparatus can be reduced to account for the introduction of the resistors 5. In particular, a split resistor arrangement can be used (not shown) to provide more accurate termination and impedance matching. Such arrangements would allow an increase in current from the media converter 8, and those skilled in the art would be able to implement these changes to realise up to a twenty percent increase, or recovery, in performance or cable length.

Finally, to allow operational isolation and balancing, and for reasons of symmetry, a further optional galvanic isolating transformer 7 is provided between the media converter 8 and the intrinsically safe Ethernet data connection 6. The transformer 7 is not capable of storing any energy which could be added to the connection 6, that would cause any arc in a connected Ethernet cable to become incendive. This can be achieved in any of a number of ways, including restricting the transformer's magnetic mass, its volume, its capacity, or the number of turns of the core or the winding, so saturation occurs at very low levels. As an alternative, the transformer 7 could have additional protection circuits, but these might create signal distortion.

The transformer 7 is in fact optional, and could be removed from the arrangement shown in FIG. 2, or re-positioned to another part of the circuit.

As a result of the above described arrangements, the boundary of the intrinsically safe part of the circuit and non-intrinsically safe part of the circuit is clearly defined, and is illustrated in FIG. 2 by the dotted line. The arrangement shown in FIG. 2 is a copper wire system.

The above described apparatus is for use where an Ethernet data signal has to be transmitted from a non intrinsically safe part of an electrical circuit into an intrinsically safe part. However, it will be appreciated that once inside the intrinsically safe part of the circuit, an Ethernet data signal can be repeated without the need for opto-isolation as shown in FIG. 2, and such an arrangement is shown in FIG. 3.

Figure 3:
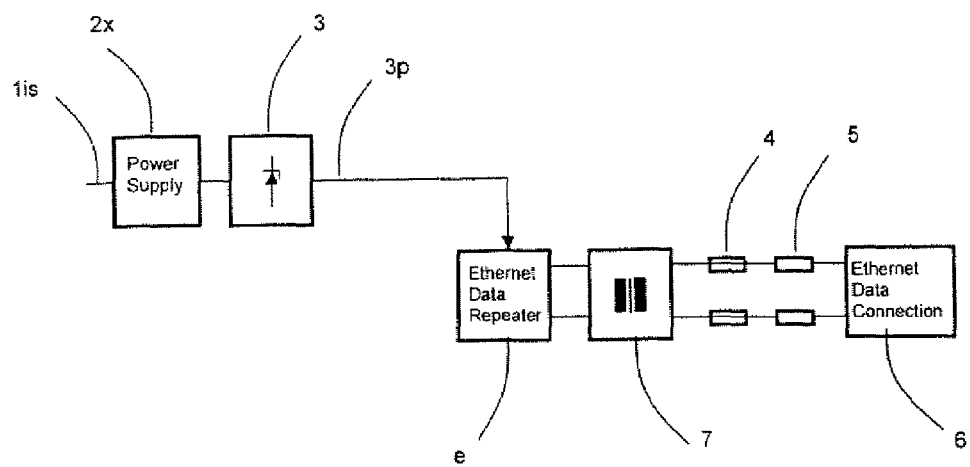
FIG. 3 is a diagrammatic view of data signal component which can be used with the data signal isolation apparatus according to the present invention.

In FIG. 3, an Ethernet data signal repeater e in a hazardous area, is provided with an intrinsically safe and isolated power supply $3p$, powered by electronic power supply $2x$. The repeater e receives intrinsically safe and isolated Ethernet data signals from the apparatus shown in FIG. 2, and repeats them, using power from the intrinsically safe power supply $3p$.

The isolated power supply $3p$ is voltage restricted, as shown at 3. The intrinsically safe power supply $3p$ can be made safe in any of the known ways, including those shown in FIG. 2.

Therefore, in this particular part of a fieldbus circuit there is no need for intrinsically safe galvanic isolation of the power supply, although it could of course be included for operational reasons. Further, the electronic device e may also contain opto-isolation, but for operational reasons rather than for any intrinsic safety requirement.

It will be appreciated that should the need arise to attach any non intrinsically safe and non isolated equipment to this part of the circuit, for example an Ethernet device and/or power, then data signal isolation apparatus like that described above in relation to FIG. 2, should be used.

Therefore data signal isolation apparatus is provided which allows an Ethernet signal to be transmitted into a hazardous area at high speeds, by separating the isolation of the electrical signal from the parasitic isolation of the power supply.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An Ethernet data signal transmission apparatus comprising:
   a non-intrinsically safe Ethernet cable, a first media converter, an optical data signal transmission means, a second media converter, an intrinsically safe Ethernet cable and an intrinsically safe power supply,
   in which the non-intrinsically safe Ethernet cable comprises a data output line and a data input line, each comprising a pair of positive and negative data cores,
   in which the first media converter is connected to said data output line and data input line of the non-intrinsically safe Ethernet cable and is adapted to convert outgoing Ethernet data signals from said data output line of the non-intrinsically safe Ethernet cable into outgoing optical data signals for the optical data signal transmission means, and to convert incoming optical data signals from the optical data signal transmission means into incoming Ethernet data signals for said data input line of the non-intrinsically safe Ethernet cable,
   in which the optical data signal transmission means is adapted to transmit said outgoing and incoming optical data signals over an electrical isolation gap,
   in which the intrinsically safe Ethernet cable comprises a data output line and a data input line, each comprising a pair of positive and negative data cores,
   in which the second media converter is connected to said data output line and data input line of the intrinsically safe Ethernet cable and is adapted to convert said outgoing optical data signals from said optical data signal transmission means back into outgoing Ethernet data signals for the data output line of the intrinsically safe Ethernet cable, and to convert incoming Ethernet data signals from the data input line of the intrinsically safe Ethernet cable into incoming optical data signals for the optical data signal transmission means,
   in which the second media converter is powered by the intrinsically safe power supply,
   in which the data output line and the data input line of the intrinsically safe Ethernet cable are provided with current limiting means comprising one or more current limiting resistors, and
   in which the current limiting resistors are disposed symmetrically about the four positive and negative cores of the intrinsically safe Ethernet cable.

2. The data signal transmission apparatus as claimed claim 1 in which the intrinsically safe power supply comprises galvanic isolation means.

3. The data signal transmission apparatus as claimed in claim 2 in which the intrinsically safe power supply comprises voltage limiting means.

4. The data signal transmission apparatus as claimed in claim 1 in which the optical data signal transmission means comprises an optical isolation circuit comprising a pair of mutually opposed optical transceivers, each comprising an optical transmitter means and an optical detector means, which are aligned with the optical detector means and the optical transmitter means respectively of the other.

5. The data signal transmission apparatus as claimed in claim 4 in which the optical transceivers are spaced apart by a segregation distance.

6. The data signal transmission apparatus as claimed in claim 5 in which the segregation distance is provided along an optical cable.

7. The data signal transmission apparatus as claimed in claim 6 in which the segregation distance is at least 1 mm.

8. The data signal transmission apparatus as claimed in claim 1 in which the data output and data input lines are further provided with one or more fuses.

9. The data signal transmission apparatus as claimed in claim 1 in which the intrinsically safe power supply comprises current limiting means.

10. The data signal transmission apparatus as claimed in claim 9 in which the current limiting means comprises one or more current limiting resistors.

11. The data signal transmission apparatus as claimed in claim 10 in which the intrinsically safe power supply further comprises one or more fuses.

12. The data signal transmission apparatus as claimed in claim 1 in which a galvanic isolating transformer is provided downstream of the second media converter.

13. The data signal transmission apparatus as claimed in claim 12 in which the galvanic isolating transformer is not capable of storing sufficient energy to cause an incendive arc in an associated intrinsically safe part of a circuit of which the apparatus forms a part in use.

14. The data signal transmission apparatus as claimed in claim 1 in which an electronic Ethernet device is provided downstream of the second media converter.

* * * * *

UNITED STATES PATENT AND TRADEMARK OFFICE
CERTIFICATE OF CORRECTION

| | | |
|---|---|---|
| PATENT NO. | : 7,687,791 B2 | Page 1 of 1 |
| APPLICATION NO. | : 12/227113 | |
| DATED | : March 30, 2010 | |
| INVENTOR(S) | : Steffan Graber et al. | |

It is certified that error appears in the above-identified patent and that said Letters Patent is hereby corrected as shown below:

Cover Page, under (74) Attorney, Agent or Firm, "Krimholz" should read --Krumholz--.

Column 4, line 20, "(only" should read --(Only--.

Signed and Sealed this
Fifteenth Day of March, 2011

David J. Kappos
*Director of the United States Patent and Trademark Office*